March 8, 1932. L. D. GRISBAUM 1,848,124
RENOVATION OF LUBRICATING OILS
Filed April 30, 1927
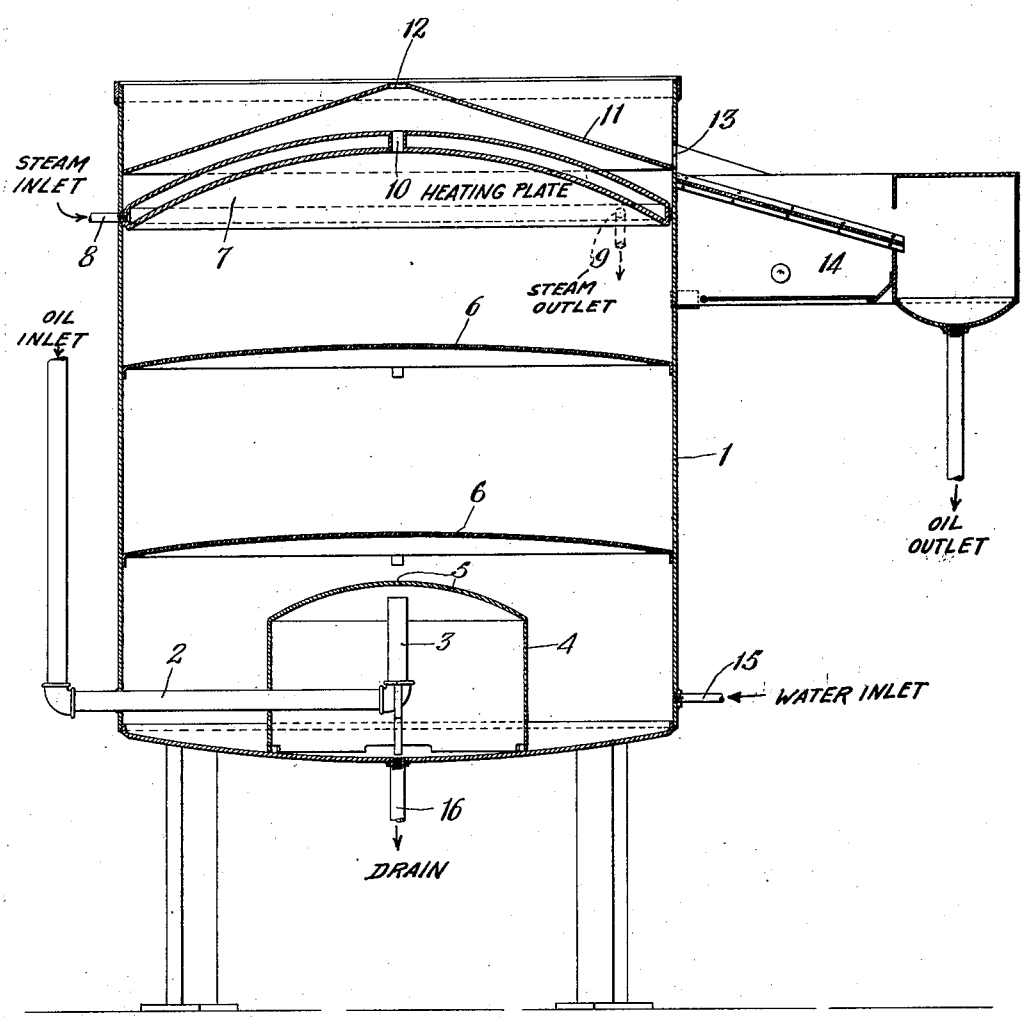
Inventor
Leonard D. Grisbaum
By his Attorneys Patented Mar. 8, 1932

1,848,124

UNITED STATES PATENT OFFICE

LEONARD D. GRISBAUM, OF INDIANAPOLIS, INDIANA, ASSIGNOR TO RAILWAY SERVICE & SUPPLY CORPORATION, OF INDIANAPOLIS, INDIANA, A CORPORATION OF INDIANA

RENOVATION OF LUBRICATING OILS

Application filed April 30, 1927. Serial No. 187,989.

This invention relates to renovation of lubricating oils, and the present application is, in part, a division and, in part, a continuation of my copending application Serial No. 74,949, filed December 12, 1925.

Specifically, the present application relates to apparatus for use in washing treating chemicals from oil, and in separating entrained water from the oil.

The primary objects of the invention are the provision of a method and apparatus which will accomplish the above mentioned washing and/or separating in a much more expeditious and effective manner than has been possible heretofore.

How these, together with other objects and advantages are obtained will be clear from the following description and the accompanying drawing which illustrates, in vertical section, the preferred embodiment of the apparatus.

The apparatus comprises a tank 1 having an oil inlet pipe 2 which passes through the tank wall adjacent the bottom thereof, and turns upwardly at 3. The inlet terminates within a bell 4 positioned in the bottom of the tank. A plurality of openings 5 are provided in the top of the bell 4.

A number of perforated diaphragms 6 (two are shown in the drawing) are disposed horizontally in the tank at spaced intervals between its top and bottom.

At the top of the tank I provide what I have termed "a pancake heating plate" 7. This plate 7 is hollow and is substantially conical in configuration. The plate is provided with connections 8 and 9 for admission and exhaust of steam. An oil overflow outlet 10 is positioned at the highest point of the plate 7.

Above the plate 7 is a collecting cone 11 which has an overflow outlet 12 at its apex. This cone 11 may be set slightly off the horizontal so that the oil flowing over it will collect at a point adjacent the outlet 13 from where it may be delivered either to some suitable meter 14 for inspection, or to some other point for use, storage or further treatment.

Water inlet and outlet pipes 15 and 16, respectively, are provided for admitting water to and draining water from the tank.

My apparatus is adapted to treat oils which are in a condition such, for example, as remains with the oil which is delivered from the chemical treating tank disclosed in my copending application above noted. That is, the apparatus is adapted to remove traces of treating chemicals from oils, or to separate and dissipate entrained water in the oil, or both.

Oil, in a condition substantially as above described, is delivered to the tank 1 through the inlet 2. The oil fills the tank and passes upwardly to the outlet 12. In its progress upwardly it comes in contact with the fitting 4 and the perforated diaphragms 6 which tend to spread the oil over the entire horizontal sectional area of the tank and break it up into many fine streams. This allows any free water which may be entrained in the oil to separate, and the water having a higher specific gravity than the oil will subside to the bottom of the tank below the oil inlet. As this water accumulates it may be drained from the tank through the outlet 16.

Adjacent the top of the tank the oil contacts with the plate 7 which is maintained at a temperature substantially above the boiling point of water, say, 250° F. As the oil passes through the relatively small outlet 10 and flows over the upper side of the plate 7 substantially all the oil is subjected to the temperature of the plate and any water which may still remain entrained is vaporized and escapes upwardly through the openings 10 and 12 and/or around the circumference of the plate 7 which is preferably made slightly less than the inside diameter of the tank.

Finally the oil rises and passes through the overflow outlet 12 to the opening 13.

The foregoing operation of the apparatus is preferred where the oil being treated contains substantially none of the treating chemicals.

If the oil being treated contains a substantial quantity of chemicals or other extraneous matter, I prefer to admit water to the tank to bring its upper surface up to a level varying between a point well above the oil inlet and a point a little below the periphery of the plate 7. In this case the fine streams of oil created by the fitting 4 and the diaphragms 6 are subjected to the scouring action of the water as it passes upwardly therethrough. The action of the heating plate 7 is, of course, the same as above stated.

In concluding, it is to be noted that I have developed an efficient and effective apparatus for separating treating chemicals and entrained water from oil without the use of any means which will produce violent agitation, such agitation being detrimental, as it tends to emulsify the oil.

I prefer to locate the point from which the oil to be treated is delivered to the inlet pipe 2 above the level of the top of the tank 1 in order that the oil will flow therethrough without the necessity of pumping.

I claim:—

1. Apparatus for separating entrained water from reclaimed oil including a tank, a perforated diaphragm in the tank, an oil outlet near the top of the tank, a heating element adjacent said outlet and means for introducing the oil into the tank below the diaphragm to flow upwardly through the diaphragm, contact with said heating element and flow out through said outlet.

2. Apparatus for separating entrained water from reclaimed oil including a tank, a perforated diaphragm in the tank, a heating element near the top of the tank, an oil overflow outlet in said element and means for introducing the oil into the tank below the diaphragm to flow upwardly through the diaphragm, contact with said heating element and flow out through said outlet.

3. Apparatus for separating entrained water from reclaimed oil including a tank, a perforated diaphragm in the tank, a conically shaped heating element near the top of the tank having an oil overflow outlet through its apex and means for introducing the oil into the tank below the diaphragm to flow upwardly through the diaphragm, contact with said heating element and flow out through said outlet.

In testimony whereof I have hereunto signed my name.

LEONARD D. GRISBAUM.